June 1, 1965
J. H. LANG
3,187,190
CONTRAROTATING HYDROELECTRIC MACHINES INCLUDING
SYNCHRONOUS AND ASYNCHRONOUS GENERATORS
Filed Nov. 20, 1962
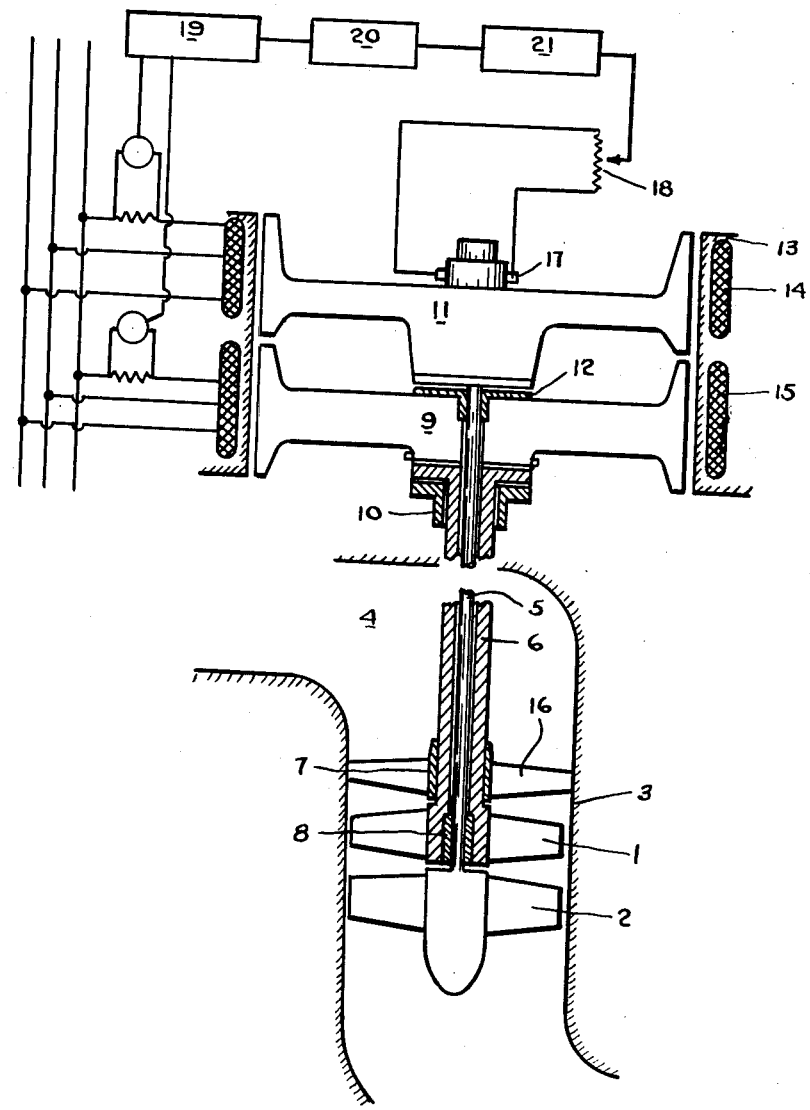
INVENTOR.
JOHANN H. LANG
BY
Raymond A. Paquin
ATTORNEY.

United States Patent Office 3,187,190
Patented June 1, 1965

3,187,190
CONTRAROTATING HYDROELECTRIC MACHINES INCLUDING SYNCHRONOUS AND ASYNCHRONOUS GENERATORS
Johann H. Lang, Beaconsfield, Quebec, Canada, assignor to Dominion Engineering Works Limited
Filed Nov. 20, 1962, Ser. No. 239,003
6 Claims. (Cl. 290—40)

This invention relates to new and improved contrarotating hydroelectric machines and has particular reference to the provision of new and improved means for establishing and maintaining control of the torque ratio of the two contrarotating elements of such machines at all loads.

In the last attempts to solve this problem have employed two direct current electric machines. Other attempts have involved the use of a duplex differential planetary gear train located in the water wheel hub.

Where two direct current electric machines were utilized, it was found that such were generally unsatisfactory. The direct current machines were found to be subject to economic size limitations. Furthermore, electric grid systems throughout the world are generally A.C. The inverter equipment necessary that these direct current machines be usable with these A.C. systems was found to be extremely expensive; as were, in fact, the direct current machines themselves. Other objections arose to the use of such a system both due to the bulk of said direct current machines and the impracticality of such machines in many installations.

Where the duplex differential planetary gear train in the hub was used, it was found that the size of the differential planetary gears was limited by the size of the hub. Furthermore, gearing so located is inaccessible and vulnerable to leaking seals. Location of the gearing externally of the water wheel hub is expensive and involves a considerably complicated design.

It is an object of the present invention to provide a contrarotating hydroelectric machine for use in conjunction with an alternating current electric power system, which machine is provided with means for controlling the torque ratio of the two contrarotating elements.

Another object of the invention is to provide a new and improved device of the type set forth which operates with high efficiency over a wide range of operating regimes.

Another object of the invention is to provide a contrarotating hydroelectric machine having means for controlling the torque ratio of the two contrarotating elements wherein the torque controlling means are monitored by signals from sensors responsive to variation of torsional stress in the driving shafts or to variations of electric power or to swirl in the water wheel outflow.

Other objects and advantages of the invention will be apparent from the foregoing description taken in connection with the accompanying drawing. It will be understood that changes may be made in the details of construction and that the arrangement of parts shown and described is the preferred form of the invention given by way of illustration only.

The single drawing figure is a diagram illustrating a hydroelectric machine and a system for controlling the torque ratio of its contrarotating water wheels.

In the following description and the appended claims, the terms "fixed-pitch" and "variable-pitch" are used with reference to water wheels. Where the water wheels are of the axial flow type, these terms are self explanatory; but it is to be understood that the full meaning of the term "pitch" in the context of this disclosure is "specific speed at maximum efficiency." In the interests of brevity and clarity the single word "pitch" will be employed hereinafter with reference to all types of water wheels, whether turbine runner or pump impeller and whether axial, radial, or tangential flow or any combination of these.

In the case of a single wheel hydraulic machine, rotation is imparted to the water passing through the wheel. In such single wheel machines, it may happen that at one point in the load range the rotation imparted to the water by the wheel cancels rotation imparted to the water before reaching or after leaving the wheel. From the viewpoint of efficiency this is desirable, however, the ideal would be the elimination of swirl from the outflow of the machine throughout the entire load range.

In a contrarotating hydraulic machine the rotation imparted to the water passing through one of the two water wheels may be modified or cancelled by the rotation imparted to the water by the other wheel.

From the viewpoint of efficiency, the ideal might be for water to approach the upstream wheel without swirl and to leave the downstream wheel without swirl. In this case, the requirement would be for the torque ratio of the two wheels to be unity. There may be, however, good reasons why, even though it involves a compromise as regards efficiency, the torque ratio of the two wheels should be other than unity, and further reasons why the actual value of the torque ratio should vary with the load factor. Such reasons may have their origin in the design of the upstream and/or downstream water passages, variations of hydraulic head, and avoidance of cavitation.

A realistic compromise with the ideal is to establish control over the ratio of torques in the water wheels of a contrarotating machine so that it may be operated at all points in the load range as near to ideal conditions as practicable.

In large hydroelectric machinery the electric power is usually in the form of alternating current at the frequency of a large grid system of which the hydroelectric machine is a relatively small component. It is necessary, therefore, if the machine is to be associated with such an alternating current grid system, that it must either use or deliver electric power at the frequency of the grid. That is to say that, when the two water wheels of a contrarotating hydroelectric machine are of the fixed pitch type, since they are always subject to identical mass flow of water, the speed of at least one of them must be varied in order to achieve a change of the torque ratio.

In a contrarotating hydroelectric machine constructed in accordance with this invention, both water wheels are of the fixed pitch type. One wheel is coupled to a synchronous electric machine synchronized with the grid; this wheel, therefore, runs at fixed speed. The other wheel is coupled to an alternating current electric machine having a variable slip characteristic whereby, though connected with the grid, it may run asynchronously; in other words, by varying the slip of this electric machine, the speed of its water wheel is varied, and consequently its torque also. It will be apparent that by controlling slip of the asynchronous electric machine, the torque ratio of the two wheels, and therefore, the swirl in the outflow, may be controlled.

Referring to the drawing, the device shown comprises a water passage 4, a portion of which water passage 4 is formed by a throat ring 3, a fixed pitch axial flow type water wheel 1 is mounted upon a hollow shaft 6 and rotates within throat ring 3. Concentric with hollow shaft 6 is an inner shaft 5; a second fixed pitch axial flow type water wheel 2 is mounted upon inner shaft 5 and rotates within throat ring 3, water wheel 1 and water wheel 2 being contrarotating.

Hollow shaft 6 runs in guide bearing 7 which is located by means of the spider 16 adjacent water wheel 1.

A guide bearing 8 is located between hollow shaft 6 and inner shaft 5 in the plane of water wheel 1.

The end of hollow shaft 6 remote from water wheel 1 is connected to lower rotor 9, directly below which is located main thrust and guide bearing 10.

Inner shaft 5 is connected at its end remote from water wheel 2 to upper rotor 11; upper thrust and guide bearing 12 is located between lower rotor 9 and upper rotor 11.

Lower rotor 9 and upper rotor 11 rotate within a common armature housing 13. Armature housing 13 is provided with separate windings 14 and 15 corresponding with rotors 11 and 9 respectively.

The lower electric machine, comprising rotor 9 and winding 15, is of the synchronous type. The upper electric machine comprising rotor 11 and winding 14 has a variable slip characteristic and may be of the wound rotor induction type as indicated in the drawing, having slip rings 17 and a resistor 18 for controlling the resistance of the rotor winding, or it may be of the commutator type having movable brushgear.

The currents in windings 14 and 15 are functions of the torques in water wheels 2 and 1 respectively, said currents being measured and compared in the conventional comparator circuit 19. Amplifier 20 amplifies signals from comparator 19 for actuator 21 which actuates the resistor 18 in the embodiment of the invention illustrated in the drawing. In an embodiment of the invention employing a commutator type induction machine actuator 21 would actuate movable brushgear.

Electric signals from comparator circuit 19 are translated into slip changes of rotor 11, which is to say, speed changes of rotor 11 and water wheel 2 resulting in torque changes; consequently, the torque ratio of the water wheels 1 and 2 is changed so as to provide the desired swirl in the outflow of water passage 4. When this desired swirl is achieved, the adjustment of the resistor 18 ceases as the desired torque ratio has been established.

It is to be understood that the upper electric machine, instead of being a variable slip induction machine, could equally well without departing from the nature or spirit of the invention be a direct current machine or a synchronous type alternating current machine with rectification, subsequent inversion being applied to the output in either case.

The torques in the water wheels 1 and 2 could be measured by evaluation of the torsional stresses in the shafts 6 and 5 respectively. These torsional stresses, as measured by strain gauges, for example, could be employed as signals in comparator 19 instead of the currents in the windings 15 and 14.

Furthermore, swirl in the outflow of water passage 4 might be measured by means of a simple vane whose angular movements could be employed to generate signals which, amplified in the amplifier 20, could be employed to adjust the torque ratio of water wheels 1 and 2 until the desired swirl is achieved.

The operation of the invention is believed apparent from the foregoing description.

Thus, it will be seen that I have provided new and improved means for accomplishing all of the objects and advantages of the invention.

I claim:

1. In combination, a constant speed hydroelectric machine; a contrarotating variable speed hydroelectric machine; a fixed pitch water wheel for each machine, said water wheels being adapted to operate in a common water stream; means for apportioning the torque developed by the two machines for nearly optimum hydraulic efficiency of the combination throughout the normal operating range of the machines comprising means for obtaining from each hydroelectric machine a signal representing the torque developed by the machine; means for comparing said signals to obtain a control signal representing the difference of said torques; and means for applying said control signal to control the speed of said variable speed machine so as to maintain said optimum hydraulic efficiency.

2. In combination, a constant speed hydroelectric machine; a contrarotating variable speed hydroelectric machine; a fixed pitch water wheel for each machine, said water wheels being adapted to operate in a common water stream; means for controlling the torque ratio of said hydroelectric machines comprising means for obtaining from each hydroelectric machine a signal representing the torque developed by the machine; means for comparing said signals to obtain a control signal representing the difference of said torques, and means for applying said control signal to control the speed of said variable speed machine so as to maintain said torque ratio within preset limits.

3. In combination, a constant speed hydroelectric machine; a contrarotating variable speed hydroelectric machine; a fixed pitch axial flow water wheel for each machine, said water wheels being coaxial and closely spaced axially for operation in a common water stream; means for controlling the torque ratio of said hydroelectric machines comprising means for obtaining a signal from each machine representing the electric loading thereon; means for comparing said signals to obtain a control signal representing the difference of said loadings; and means for applying said control signal to control the speed of said variable speed machine so as to maintain said torque ratio within preset limits.

4. In combination, a hydroelectric machine having contrarotating, axial flow, fixed pitch, coaxial water wheels operating in closely spaced axial relation in a common water stream and a shaft for each water wheel for driving the machine; means for controlling the torque ratio of said shafts comprising means for obtaining for each shaft a signal representing the torque developed therein; means for comparing said signals to obtain a control signal representing the difference of said torques; and means for applying said control signal to vary the speed of one water wheel in relation to the other water wheel so as to maintain said torque ratio within preset limits.

5. In combination, a synchronous hydroelectric machine; a contrarotating asynchronous hydroelectric machine; a fixed pitch axial flow water wheel for each machine, said water wheels being coaxial and closely spaced axially for operation in a common water stream; means for controlling the speed differential between said synchronous and asynchronous machines so as to maintain the torque ratio of the two machines within preset limits comprising means for obtaining a signal from each machine representing the electric loading thereon; means for comparing said signals to obtain a control signal representing the difference of said loadings; and means for applying said control signal to control the speed of said asynchronous machine and thereby said speed differential.

6. The combination defined in claim 5 wherein said asynchronous machine is an induction machine having a wound rotor and a variable resistor in series with the rotor winding, and wherein said control signal is applied to vary the resistance of said resistor and thereby control the slip speed of said rotor, said slip speed being the speed differential mentioned in claim 5.

References Cited by the Examiner

UNITED STATES PATENTS

| | | | |
|---|---|---|---|
| 760,035 | 5/04 | Stumpf | 253—16.5 |
| 1,804,606 | 5/31 | Grau | 318—100 |
| 2,864,040 | 12/58 | Trotsky | 318—99 |

ORIS L. RADER, *Primary Examiner.*